July 26, 1955  A. J. HERSEY ET AL  2,714,001
RESILIENT SUPPORT

Filed Dec. 26, 1951  2 Sheets-Sheet 1

INVENTOR
ARTHUR J. HERSEY
AND KENNETH J. HERSEY
BY H. F. Woodward
atty

United States Patent Office 2,714,001
Patented July 26, 1955

2,714,001

RESILIENT SUPPORT

Arthur J. Hersey, Minneapolis, and Kenneth J. Hersey, Hopkins, Minn.

Application December 26, 1951, Serial No. 263,376

4 Claims. (Cl. 267—20)

This invention relates to an improvement in supports and more particularly to a support that is connected between a load carrying member and a load supporting member. An object of the invention is a resilient support that will give a floating and continually level support of a load carrying member.

Other and further objects of the invention and the advantages of the same will be pointed out hereinafter and indicated in the appended claims, or to be obvious to one skilled in the art upon understanding of the present disclosure.

For the purpose of this application there has been elected to set forth certain particular structures but it is to be understood that they are here presented for illustrative purposes only and are not to be accorded any interpretation such might have the effect of limiting what is claimed short of its true and comprehensive scope in the art.

In the accompanying drawings there are illustrated three examples of the physical embodiment of the invention according to the best mode that has thus far been devised, but it will be understood the various changes and alterations may be made in the exemplified structures within the scope of the appended claims.

The support is very useful in a resiliently mounted floating seat particularly adopted for use in vehicles such as trucks, busses, passenger railroad cars, passenger airplanes to cushion the passengers against objectionable or harmful shocks, jars and vibrations caused by the vehicle passing over uneven road surfaces or rails.

In certain types of vehicles, such as heavy duty vehicles, considerable jarring or vibration of the vehicle frame occurs, which is transmitted to the operator's seat supported thereon. This not only fatigues the operator but also renders manipulation of the vehicle by the operator, and any manipulatable auxiliary mechanism that might be propelled thereby, difficult, if not dangerous. This problem is particularly aggravating with respect to relative high speed modern wheeled vehicles in which the wheels are usually rubber tired and the vehicle frame is non-resiliently or rigidly connected to the wheels, which results in considerable bouncing of the vehicle frame. Such type of vehicle (particularly tractors) is usually employed to pull or otherwise propel other mechanism, such as wheeled scrapers; and during travel thereof, jarring of the operator's seat is particularly bothersome to the operator when he desires to manipulate such other mechanism by controls accessible to him while he is seated.

This invention will obviate the above described difficulties.

The invention can be successfully employed to dampen the shock from a vehicle wheel to the frame which might be due to irregularities in a road bed. In such a use a support could be employed as for individual connection between wheels and a frame of a motor vehicle.

Another use of the invention which gives excellent results is in vehicle wheel suspensions for trailers and the like. When used for this purpose the up and down movements of the wheel as it encounters irregularities in the road surface are yieldably resisted.

The invention may be employed in seat supports where the seat is not used in connection with vehicles, i. e. seats used in home and offices.

Figure 1:
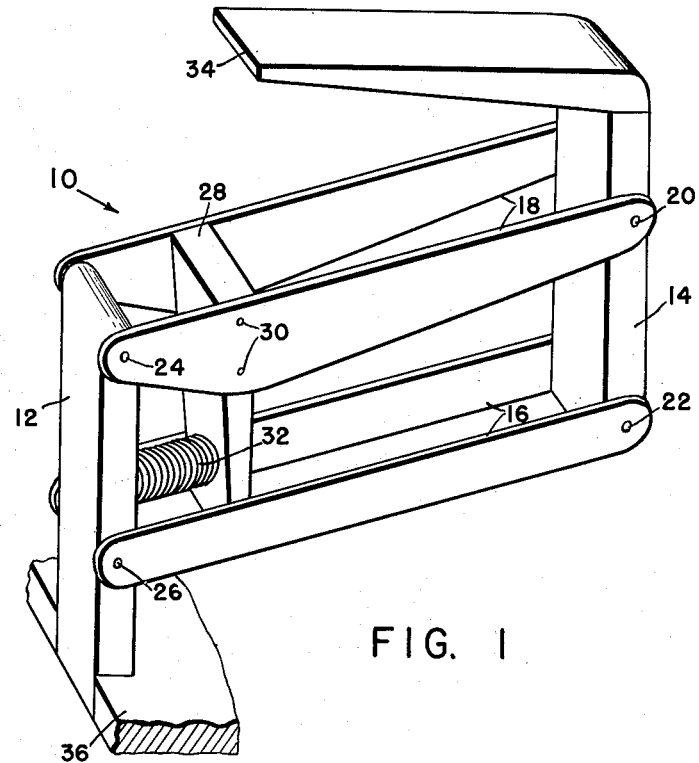
Fig. 1 is a perspective view of the new support.

Referring to the drawing in detail 10 indicates generally the support which includes substantially vertically extended parallel and spaced apart support postlike members. The lower end of post 12 may be connected to the frame of a vehicle 36, to a tractor where the normal seat is connected or to any load supporting postlike member. The member 14 is secured at the upper end to a load carrying member 34, which in the case where the invention is employed in connection with a seat, the seat is mounted on member 34. The posts 12 and 14 are connected by spaced parallel members or bars 16 and 18 which are pivotally mounted at 22 and 26 and 20 and 24 respectively to the upright posts. Substantially parallel to but spaced apart from post members 12 and 14 is arm member 28. This arm member is rigidly connected to parallel members 18 at 30. Suitably secured between post member 12 and arm 28 is spring 32 or other suitable resilient and/or elastic load supporting member which normally urges the support to the position shown in Figure 1. Member 34 remains level in all positions and this is highly important.

Figure 2:
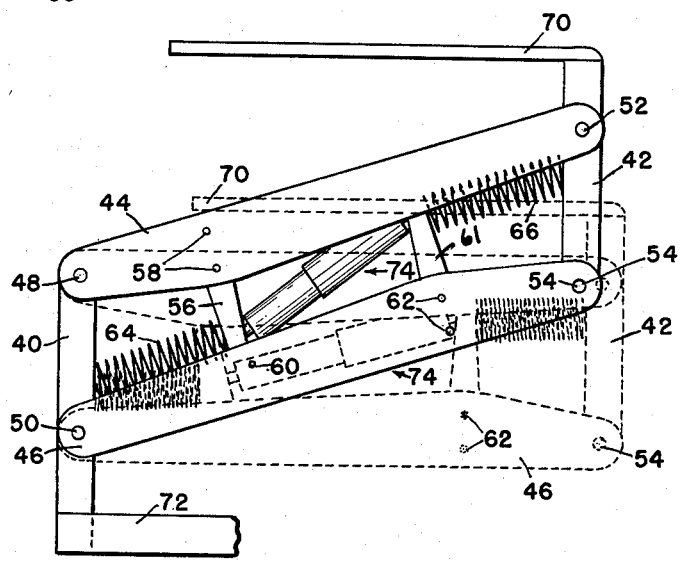
Fig. 2 is a side view of a modified form of the support showing two positions therefor.

In Figure 2 is shown a modified form of the connection and includes substantially parallel and upright post members 40 and 42 which are pivotally connected to substantially parallel members or bars 44 and 46. These bar members are pivotally mounted at 50 and 48 to post member 40 and at 52 and 54 to post member 42. Positioned between the parallel members 44 and 46 and spaced apart from parallel post members 40 and 42 is arm member 56. This arm member is rigidly secured at 58 to the parallel bars 44. Secured between posts 40 and arm 56 is springlike member 64 normally urging the support in the position shown in solid line in Figure 2. In bar member 46 there is placed a removable stop member 60 which limits the distance of the travel of arm member 56. Positioned apart from arm member 56 and rigidly connected to bar members 46 at 62 is arm member 61. Positioned between the free end of arm 61 and post member 42 is spring 66 or equivalent acting member.

To control the smooth operation of the connection from the position shown in dotted lines to the full line position or vice versa, a hydraulic member shown generally at 74 is positioned between members 56 and 61. The hydraulic member 74 can be so positioned that when in the lower position shown in dotted lines may lay in a horizontal position rather than in the position shown in dotted lines.

Figure 3:
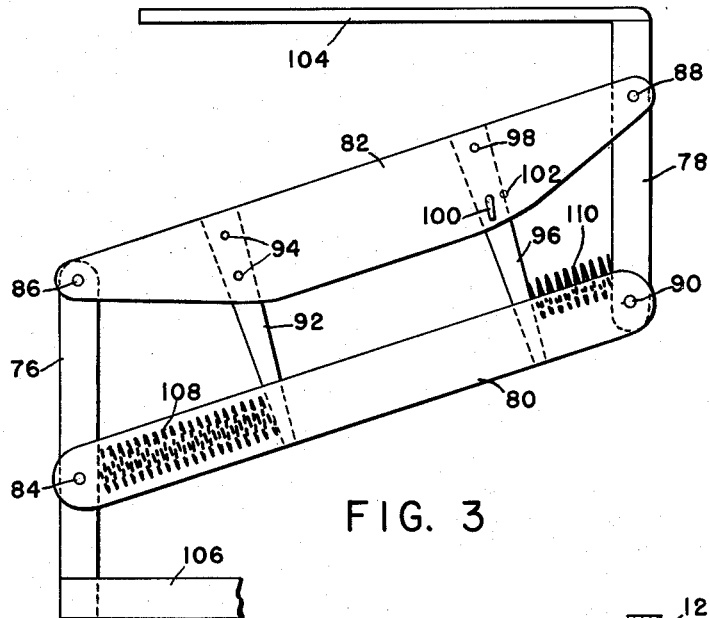
Fig. 3 is a side view of another form of the support.

In Figure 3 is another modified form of the support which includes the spaced apart upright post members 76 and 78 having pivotally connected thereto substantially parallel bar members 80 and 82 at 84 and 86 to post member 76 and at 88 and 90 to post member 78. Arm member 92 is rigidly connected to parallel bar members 82 at 94. A member such as a spring 108 normally urges the support to the positions shown in Figure 3. Arm member 96 is pivotally connected at 98 to bar members 82 and is secured in the desired position by lock pin member 100. A series of holes such as 102 are provided so that the position of 96 can be adjusted. A spring-like member 110 is positioned between the free end of 96 and post member 78 and cushions the return of arm member 96 to the position shown in Figure 3. The load carrying member 104 is secured to post member 78.

Figure 4:
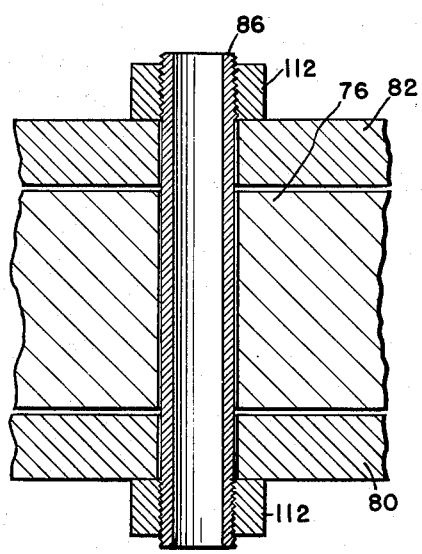
Fig. 4 is an enlarged sectional view with parts broken away of a pivot bearing.

In Figure 4 is one form of means of pivotally connecting parallel members such as 16 and 18 to upright members 12 and 16. It is understood that other pivot connected means other than member 86 may be used to connect the upright members such as 76 and 78. The member 86 shown in Figure 4 extends through post member 76 and arms 82. The assembly is held in place by removable threaded nuts 112 adapted to receive the threaded ends of 86.

Figure 5:
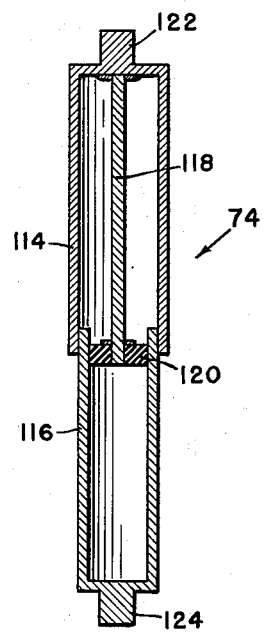
Fig. 5 is an enlarged sectional view of a shock absorber.

It is to be understood that any suitable hydraulic cylinder may be employed such as shown in Figure 6 of Patent No. 2,260,634, Patent No. 2,572,910 in Figure 6 and French Patent No. 994,240. The one shown includes internal cylinder 116, external cylinder 114, piston 120 mounted on piston rod 118, and end members 122 and 124 for securing the cylinder in place. The means for transferring the hydraulic fluid past the piston 120 is not shown but may be by any known and usual means for example as shown in Figure 6 of United States Patent No. 2,572,910. The relationship of the hydraulic member may be any desired in connection with the parallel member, for example the hydraulic member could be connected between 36 and 34. The shock absorber as shown in Figure 2 contains a cylinder 116 which moves in cylinder 114. The piston 120 glides in cylinder 116. The piston rod is connected to the rear of cylinder 114 as shown in Figure 5. A motion which elevates or lowers the parallel bars 44 and 46 moves the piston in the cylinder 116 and causes the liquid to be transferred from one side of the piston 120 to the other side thereof.

It is to be understood that the spring-like member 72, 64, 66, 108, and 110 may be held in place by any suitable means; for example, lugs. The position of the springs in distance from the lower end of the movable members, such as 56, may be adjusted and, if desired, a series of springs may be employed where one is shown in the drawings.

What is claimed:

1. A support for connecting a load supporting member to a load carrying member comprising spaced apart substantially vertically extending posts, one of said posts connected to the load supporting member and the other post connected to the load carrying member, two pairs of spaced apart and substantially parallel bars pivotally connected to the posts, one pair of said bars positioned above the other pair of said bars, a member connected to and extending substantially downwardly from one of said pair of bars, a member connected to and extending upwardly from the other pair of parallel bars, and compressible means operatively connected to one of the said vertically extending posts and the downwardly extending member and between the other vertically extending post and the upwardly extending member.

2. A support for connecting a load carrying member to a load supporting member comprising spaced apart substantially vertically extending posts, one of said posts connected to the load supporting member and the other post connected to the load carrying member, two pairs of spaced apart and substantially parallel bars pivotally connected to the posts, one of said pair of parallel bars spaced above the other pair of parallel bars, an arm member rigidly connected to one pair of said parallel bars and extending downwardly therefrom, an arm member rigidly connected to and extending upwardly from the other pair of parallel bars, compressible means operatively connected to one of said vertically extending posts and the downwardly extending arm member and between the other vertically extending post and the upwardly extending arm member, and a shock absorber connected between the said arm members for aiding in controlling the speed of the movement of the parallel bars.

3. A support for connecting a load supporting member to a load carrying member comprising spaced apart substantially vertically extending posts, one of said posts connected to the load supporting member and the other connected to the load carrying member, two pairs of spaced apart and substantially parallel bars pivotally connected to the posts, one pair of said parallel bars spaced above the other pair of parallel bars, an arm member connected to and extending substantially downwardly from one of the pair of parallel bars, an arm member connected to and extending upwardly from the other pair of parallel bars and spring means operatively connected to one of said vertically extending posts and the downwardly extending arm member and between the other vertically extending posts and the upwardly extending arm member, and a shock absorber operatively connected with the said arm members for controlling the speed of movement of the parallel bars.

4. A support for connecting a load supporting member to a load carrying member comprising spaced apart substantially vertically extending posts, one of said posts connected to the load supporting member and the other post connected to the load carrying member, two pairs of spaced apart and substantially parallel bars pivotally connected to the posts, one pair of said bars positioned above the other pair of said bars, a member connected to and extending substantially downwardly from one of said pair of bars, a member connected to and extending upwardly from the other pair of parallel bars, and spring means operatively connected to one of the said vertically extending posts and the downwardly extending member and between the other vertically extending post and the upwardly extending member.

References Cited in the file of this patent

UNITED STATES PATENTS

| 1,875,314 | Armstrong | Aug. 30, 1932 |
| 2,212,769 | Boxan | Aug. 27, 1940 |
| 2,233,145 | Schimek | Feb. 25, 1941 |
| 2,351,291 | Ross | June 13, 1944 |
| 2,486,048 | McIntyre et al. | Oct. 25, 1949 |
| 2,531,572 | Knoedler | Nov. 28, 1950 |

FOREIGN PATENTS

| 499,426 | Germany | June 6, 1930 |
| 634,647 | Germany | Sept. 1, 1936 |
| 994,240 | France | Aug. 3, 1951 |

(Corresponding U. S. 2,630,854, Mar. 10, 1953)